United States Patent

[11] 3,627,740

| [72] | Inventors | Johannes Schafer;<br>Frederico Engel; Gerhard Berg, all of Marl,<br>Germany |
|---|---|---|
| [21] | Appl. No. | 9,106 |
| [22] | Filed | Feb. 9, 1970 |
| [45] | Patented | Dec. 14, 1971 |
| [73] | Assignee | Chemische Werke Huls A.G.<br>Marl, Germany<br>Continuation of application Ser. No.<br>534,550, Oct. 14, 1965, now abandoned.<br>This application Feb. 9, 1970, Ser. No.<br>9,106 |
| [32] | Priority. | Oct. 14, 1964 |
| [33] | | Germany |
| [31] | | P 14 95 387.8 |

[54] PROCESS FOR INCREASING THE MOLECULAR WEIGHT OF UNSATURATED POLYMERIC HYDROCARBONS
5 Claims, No Drawings

| [52] | U.S. Cl. | 260/80.78, 260/80.7, 260/94.3 |
|---|---|---|
| [51] | Int. Cl. | C08f 1/56 |
| [50] | Field of Search | 260/80.7, 94.3, 88.2, 80.78 |

[56] References Cited
UNITED STATES PATENTS

| 3,119,800 | 1/1964 | Moss | 260/94.2 |
|---|---|---|---|
| 3,236,824 | 2/1966 | Wilhjelm | 260/88.2 |
| 3,271,381 | 9/1966 | Andersen | 260/94.9 |
| 3,316,233 | 4/1967 | Feay | 260/93.7 |
| 3,328,376 | 6/1967 | Bernemann et al. | 260/94.3 |
| 3,350,370 | 10/1967 | Keller et al. | 260/80.78 |

OTHER REFERENCES

Engle et al., Molecular Weight Jump Reaction, Rubber Age., (Dec., 1964). pp. 410–415.

*Primary Examiner*—Joseph L. Schofer
*Assistant Examiner*—Stanford M. Levin
*Attorney*—I. William Millen

ABSTRACT: In the production of polydiolefins produced on the basis of Ziegler catalysts wherein the metallic compound of the Ziegler catalyst is from groups IV or V of Mendeleef's Periodic Table, a subsequent step is incroporated which comprises adding to the reaction solution after the desired conversion has been reached, a compound containing active hydrogen, such as an acid, in amounts of 0.002–2 mols per mol of the cocatalyst, e.g., triisobutyl aluminum, the degree of increase of the molecular weight corresponding to the amount of added compound containing active hydrogen.

PROCESS FOR INCREASING THE MOLECULAR WEIGHT OF UNSATURATED POLYMERIC HYDROCARBONS

This application is a continuation of application Ser. No. 534,550, filed Oct. 14, 1965, now abandoned.

This invention relates to a process for the production of unsaturated polymeric hydrocarbons having high Mooney viscosities.

In the production of polymeric hydrocarbons by means of catalytic polymerization, the viscosity of the reaction mixture generally increases with increasing conversion. The increase in viscosity is dependent on the concentration and the molecular weight of the dissolved polymer. With increasing viscosity, however, it becomes more and more difficult to remove the heats of polymerization and agitation. Therefore, to avoid runaway reactions, the concentration of the polymer is normally maintained at values between 5 and 20 percent.

Today, polymers having high Mooney viscosities (100 to 150) are of ever increasing technical importance, but though there are a number of modified polymerization processes for their production, such processes can be conducted only with substantial difficulties. For example, if low-space time yields or impractical reaction conditions are to be avoided, it is often necessary to employ extremely pure reaction components and solvents.

Likewise, though it has been suggested to increase the molecular weight of polybutadiene or polyisoprene by adding to the polymerization mixture arylazo or arylhydrazo compounds in quantities of 0.2 to 3 percent by weight, these azo compounds are relatively ineffective with other unsaturated polymeric hydrocarbons, yielding little or no increase in molecular weight.

Furthermore, it is known that butadiene copolymers containing nitrile groups can be cross-linked with a metallic halogenide of the Lewis acid type and a liquid halogen compound having at least two mobile halogen atoms. This is accomplished by mixing these two compounds into a liquid solvent-free copolymer—before or after admixture of carbon black and heating to 150° C. Although this cross-linking technique does in fact increase polymericular weight, the final products have limited utility.

An object of this invention, therefore, is to provide an improved process for the production of polymers having high Mooney viscosities.

Upon further study of the specification and claims, other objects and advantages of the present invention will become apparent.

To attain the objects of this invention, it has now been discovered that the molecular weight of unsaturated, polymeric hydrocarbons, produced by the homopolymerization of diolefins or copolymerization of mono-olefins with diolefins, or copolymerization of various diolefins with one another in inert organic solvents with a Ziegler-type catalyst can be specifically increased if there is added to the reaction mixture, after the polymerization process is terminated or the desired conversion has been reached, but before the catalyst is decomposed, 0.002 to 2 moles, preferably 0.005 to 1 mole, and particularly 0.01 to 0.6 mole, based on the hydride or organometallic component of the Ziegler-type catalyst, of a compound containing active hydrogen.

In general, unsaturated polymeric hydrocarbons include those produced from monomers having preferably about two to 20 carbon atoms, more preferably about two to six carbon atoms. When diolefins are used they are preferably conjugated, such as butadiene and isoprene. When a mono-olefin is copolymerized with a diolefin, the mol ratio range is respectively 0.001 to 999 mol of mono-olefin to 1 mol diolefin. The mono-olefin is advantageously an α-olefin. Styrene and the like can also be used as one of the monomers.

For the polymerization proper, the Ziegler-type catalyst is generally composed of: (a) a catalytic compound of Groups IV or V of Mendeleev's Periodic Table, and (b) a second compound capable of giving rise to hydride ions or carbanions, said second compound being a hydride or organometallic compound (preferably an alkyl, aryl, or aralkyl compound, or the corresponding halides thereof), alkyl, aryl, or aralkyl metal halides, or halometal hydrides, the metal in both cases being selected from Groups II and III of Mendeleev's Periodic Table. The preferred mole ration of (a) to (b) is 1 : 1 to 1 : 1,500, more preferably 1:5 to 1: 250. For more specific information regarding these Ziegler-type catalysts, attention is invited to the voluminous prior art teachings, such as "Linear and Stereoregular Addition Polymers," Gaylord and Mark, Interscience Publishers, New York (1959), particularly at pages 90–106.

Particularly preferred unsaturated polymeric hydrocarbons are, for example, polybutadienes obtained by the polymerization of butadiene with the catalyst system of titanium compounds/organometallic compounds, the preferred compounds in this connection being iodine-containing titanium compounds or titanium tetrachloride and/or titanium tetrabromide in the presence of iodine-yielding compounds.

Furthermore suitable are the polyisoprenes producible with the mixed catalysts of titanium compound/organometallic compounds, as well as the ethylene/propylene copolymers which can be produced with the mixed catalysts of vanadium compounds/organometallic compounds, containing an unsaturated third component, such as for example, biscyclopentadiene.

In many of such polymerization reactions now being used, considerable technical difficulties are encountered in attempting to produce polymers having Mooney viscosities substantially higher than ML–4=50. However, such polymers having ML–4 viscosities as high as 90 and 140 are quite useful, especially in the production of oil-plasticized rubbers, and hence there exists a need for an economical and simplified process of producing the same. According to the present process it is now possible, in a simple manner, to increase the Mooney viscosity of such polymers, for example, from 20 to 50, or from 20 or 50 to 90–140. Thus, an advantage of this process resides in that the molecular weight can be kept low during the polymerization proper, whereby caking of polymers on the inner walls of the reaction vessels and pipelines can be substantially decreased. This advantage is particularly of value in solution polymerization processes wherein the corresponding polymer remains in solution and the viscosity of the reaction mixture is thereby increased with increasing conversion and increasing molecular weight.

Solvents which are particularly suitable in this process are hydrocarbons containing preferably from three to 30 carbon atoms, which may be aliphatic or cyclic saturated or unsaturated hydrocarbons, as well as aromatic hydrocarbons, such as, for example, benzene, hexane, butane, isopropyl cyclohexane, and the homologs and isomers thereof.

The compound which is added to increase the molecular weight must contain active hydrogen which is defined as: a compound selected from the group consisting of the formula RX, in which R is a hydroxyl-group, an alkoxy-group, the anion of an inorganic acid, the anion of an organic acid, a phenoxy-group, the anion of an enolized carbonyl-compound, an amide-group, an imide-group and X is a hydrogen atom.

Suitable compounds containing active hydrogen include, for example, water, alcohols, mercaptans, inorganic and organic acids, as well as phenols, thiophenols, enolizable carbonyl compounds, and imides.

There are no restrictions to the aforesaid various types of compounds, i.e., the only important consideration is that they contain active hydrogen.

For example, any type of alcohol can be used, e.g., methanol, ethanol, n-propanol, isopropanol, butanol and the isomers thereof, benzyl alcohol, triphenyl carbinol, naphthylehtyl carbinol, glycol, propylene glycol, nonanediol, glycerin, allyl alcohol, 2-butenediol-1,3, ethanolamine, diethanolamine, triethanolamine, and trichloroethanol.

Preferred mercaptans are methyl and ethyl mercaptan and the homologs thereof, a suitable group of mercaptans contain alkyl groups up to 30 carbon atoms.

The preferred inorganic acids are nitric acid, nitrous acid, sulfuric acid, sulfurous acid, phosphoric acid, phosphorous acid, hydrazoic acid, and oxyhalic acids, such as, for example, perchloric acid. A preferred inorganic acid is anhydrous hydrogen chloride.

Preferred organic acids are, for example, formic acid, acetic acid, propionic acid, oleic acid, stearic acid, trichloracetic acid, linolenic acid, propargylic acid, phenylacetic acid, naphthalene carboxylic acid, cinnamic acid, adipic acid, azelaic acid, phthalic acids, acetylene dicarboxylic acid, naphthalene dicarboxylic acid, tricarballylic acid, metacrylic acid, crotonic acid, vinyl acetic acid, acrylic acid, lactic acid, citric acid, amino-acetic acid, aminovaleric acid, thiopropionic acid, and ricinoleic acid, benzene sulfonic acids, toluene sulfonic acid, sulfinic acids, such as benzene sulfinic acid and naphthalene sulfinic acid, as well as all homologous compounds which split off protons easily.

Preferred phenols are phenol itself, pyrocatechin, resorcinol, hydroquinone, pyrogallol, phloroglucine, oxyhydroquinone, inositol, 1-isopropyl-4-hydroxybenzene, salicylic acid, naphthol, nitronaphthol, thiophenol, and the homologs thereof, as well as polythiols.

Preferred enolizable carbonyl compounds are acetylacetone and acinitro compounds.

Preferred imides are ditosyl imide and ditrichloroacetyl imide.

Likewise suitable are polymers containing the above-mentioned functional groups, such as, for example, copolymers of vinyl chloride with maleic acid. The decisive factor for the triggering of this reaction is only the presence of functional groups. The organic residue attached to the functional group exhibits very little or no influence upon the reaction, but determines the solubility of such compounds within the reaction mixture.

These compounds are generally required in very low concentrations. These concentrations range between 0.002 to 2 moles, normally, however, between 0.005 to 0.6 mole, per mole of the hydride or organometallic catalyst component.

The addition of these compounds after termination of the polymerization or after the desired conversion has been achieved is done in such a manner that the compound, advantageously present in dissolved form, is added to the polymerization charge all at once, or incrementally, and is rapidly mixed with this charge. When using incremental batchwise addition, a somewhat higher increase in the molecular weight is obtained. This reaction obviously takes place without an increase in the solid content. Therefore, the molecular weight increase is independent of the monomer concentration still present in the polymerization charge. This increase even takes place when the monomer is completely absent. Generally, the increase in the molecular weight is directly proportional (but not necessarily linearly) to the quantity of the compound which is added.

The temperature of the reaction mixture can range between —50 and 100° C. Suitably, the catalyst is added at the polymerization temperature. After a reaction time which can be up to 10 hours, preferably, however, less than 10 minutes, and in special cases even less than 1 minute, the reaction mixture is worked up in a conventional manner, if desired by destroying the catalyst with alcohol or ketones, precipitating the polymer with alcohol, or driving off the solvent with steam.

The present method has the advantage that it is only necessary to add easily obtainable compounds to the polymers in order to achieve a specific molecular weight increase. Surprisingly, the advantageous properties of the polymerized products are retained throughout. Thus, the polymers produced in this manner are, for example, free from gel.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

In a polymerization reactor free from air and water, 2.42 g. TiCl₄ (12.75 millimoles) and 2.33 g. Al(iC₄H₉)₃(12.75 millimoles) are dissolved in 1.5 liter benzene and stirred for 15 minutes at 30° C. Thereafter, 150 ml. isoprene (102 g. =1.5 mole) are added. After a polymerization time of 5 hours at 30° C. (conversion 90 percent), half of the charged mixture is removed by vacuum filtration, and the polyisoprene is precipitated. ML—4=40; gel: 3 percent $\eta_{red}$: 2.5.

The remaining polymerization solution is mixed with 0.07 ml. water ( =3.9 millimoles), a great increase in the viscosity taking place. The isolated polyisoprene has the following properties: ML—4:86; gel: 10 percent; $\eta_{red}$ : 2.9.

Analogous results can be obtained with the following compounds containing active hydrogen, these compounds being effective as cocatalysts:

| Cocatalyst | Millimoles | Fractions in Millimoles | ML-4 Before addition | ML-4 After addition |
|---|---|---|---|---|
| Acetic acid | 0.9=0.054 g. | 3×0.3 | 35 | 111 |
| Phenol | 0.9=0.084 g. | 3×0.3 | 47 | 110 |
| Benzyl alcohol | 0.9=0.097 g. | 3×0.3 | 32 | 63 |
| Cumenehydroperoxide | 4.34=0.714 g. | 1×0.3 | 37 | 85 |
| Nitromethane | 0.9=0.0549 g. | 3×0.3 | 43 | 67 |

EXAMPLE 2

In a 3liter polymerization reactor there are polymerized 150 ml. (102 g. =1.5 mole) of isoprene in the presence of 3.414 g. (18 millimoles) of TiCl₄ and 3.75 g. (18.93 millimoles) of aluminum triisobutyl in 1.5 liter =(0.989 kg.) hexane as the solvent. After obtaining a conversion of 90percent, half of the charge is introduced into methanol, the polyisoprene coagulating. The dried product has a Mooney viscosity of ML—4= 61. The gel content is 17 percent.

The remaining polymerization solution is mixed with 0.025 ml. (1.39 millimole) of water at 20° C., the resultant mixture is vigorously agitated. After 30 minutes, the strongly viscous solution is stabilized and the polyisoprene precipitated therefrom by the addition of methanol. The ML—4 value has increased to 97; the gel content is 21 percent.

Analogous results can be obtained with the following compounds containing active hydrogen, these compounds being effective as cocatalysts:

| Cocatalyst | Mg. | Millimoles | ML-4 Before addition | ML-4 After addition | Gel, percent Before addition | Gel, percent After addition |
|---|---|---|---|---|---|---|
| Phenol | 0.085 | 0.9 | 59 | 78 | 16 | 18 |
| Glacial acetic acid | 0.054 | 0.9 | 66 | 77 | 15 | 17 |
| Water¹ | 0.018 | 1.0 | 78 | 111 | 13 | 17 |
| Ethanol | 0.0414 | 0.9 | 54 | 67 | 21 | 23 |

¹ Dissolved in benzene.

EXAMPLE 3

In a polymerization reactor free from air and water, 4.20 g. TiCl₄ (22.0 millimoles) and 2.50 g. Al(C₂H₅)₃ (22.0 millimoles) are dissolved in 1.5 liter of benzene and stirred for 10 minutes at 20° C. Thereafter, 167 g. butadiene-1,3 (162 g.=3.0 moles) are introduced as a liquid. After a polymerization time of 5 hours, at 30° C., (conversion 60 percent), half of the charge is vacuum filtered and the polybutadiene is precipitated.

ML—4: 22; $\eta_{red}$ :2.1.

The remaining polymerization solution is mixed with 0.304 g.=6.6 millimoles of formic acid. After allowing the mixture to stand for 1 hour, the Mooney viscosity is:

ML—4: 43; $\eta_{red}$ :2.6.

Analogous results can be achieved with the following compounds containing active hydrogen, which compounds are effective as cocatalysts:

| Cocatalyst | Millimoles | Moles per mole of Al | ML-4 Before Addition | After |
|---|---|---|---|---|
| Phenol | 11=<br>1.034 g. | 0.5 | 57 | 75 |
| Thiophenol | 11=<br>1.210 g. | 0.5 | 86 | 107 |
| Ditosyl imide | 6.6=<br>2.145 g. | 0.3 | 79 | 104 |

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

In the following claims, the term "unsaturated polymeric hydrocarbons" defines polymers which have more than terminal unsaturation, having preferably at least 0.1 and more preferably at least three double bonds per 1,000 carbon atoms in each polymer.

What is claimed is:

1. In a process for the production of an unsaturated polymer selected from the group consisting of polyisoprene and a terpolymer of ethylene, propylene and polyethylenically nonconjugated unsaturated hydrocarbon, which comprises polymerization in an inert organic solvent in the presence of a Ziegler-type catalyst composed of:
    a. a catalytic compound of an element selected from the group consisting of Groups IV and V of Mendeleev's Periodic Table; and
    b. a second compound selected from the group consisting of a hydride and an organometallic compound of a metal of Groups II and III of Mendeleev's Periodic Table, said organometallic compound being an alkyl, an aryl, or an aralkyl compound;

The improvement which comprises conducting the polymerization to at least about a 60 percent conversion and then increasing the molecular weight of the resultant polymer by the subsequent step of adding to the resultant reaction solution containing said resultant polymer, said Ziegler-type catalyst according to (a) and (b) and inert organic solvent, a compound containing active hydrogen in amount of 0.002 to 2 moles per mole of said second compound, said compound containing active hydrogen being selected from the group consisting of water, an alcohol, a mercaptan, a phenol, a thiophenol, acetylacetone, and an imide, the molar ratio of (a) to (b) being 1:5 to 1:250, and the molar ratio of the compound containing active hydrogen to (b) being 0.005:1 to 0.6:1.

2. A process as defined by claim 1, wherein the catalystic compound (a) is a titanium or vanadium compound.

3. A process as defined by claim 1 wherein the catalytic compound (a) is titanium iodide.

4. A process as defined by claim 1 wherein the unsaturated polymer is isoprene; (a) is TiCl$_4$ (b) is triethyl or triisobutyl aluminum and the compound containing active hydrogen is water, methanol, ethanol, formic acid, acetic acid, phenol, thiophenyl, benzyl alcohol, cumene hydroperoxide, nitromethane, or ditosyl imide.

5. A process as defined by claim 4 wherein the polymerization is conducted to at least 90 percent conversion.

* * * * *